US008441946B2

(12) United States Patent
Vanderhaegen et al.

(10) Patent No.: US 8,441,946 B2
(45) Date of Patent: May 14, 2013

(54) METHOD FOR MONITORING IMPULSE NOISE

(75) Inventors: Dirk Vanderhaegen, Wemmel (BE); Danny Van Bruyssel, Temse (BE)

(73) Assignee: Alcatel Lucent, Paris (FR)

( * ) Notice: Subject to any disclaimer, the term of this patent is extended or adjusted under 35 U.S.C. 154(b) by 842 days.

(21) Appl. No.: 12/060,468

(22) Filed: Apr. 1, 2008

(65) Prior Publication Data
US 2008/0239982 A1 Oct. 2, 2008

(30) Foreign Application Priority Data

Apr. 2, 2007 (EP) .................... 07290401

(51) Int. Cl.
*H04L 12/26* (2006.01)
(52) U.S. Cl.
USPC ............................................. 370/252
(58) Field of Classification Search ........... 370/252, 370/253, 254
See application file for complete search history.

(56) References Cited

U.S. PATENT DOCUMENTS

| 2004/0095921 | A1* | 5/2004 | Kerpez | 370/351 |
| 2005/0286566 | A1* | 12/2005 | Tong et al. | 370/503 |
| 2007/0260410 | A1* | 11/2007 | Raymond | 702/81 |

FOREIGN PATENT DOCUMENTS

| EP | 1359696 A2 | 5/2003 |
| WO | WO 97/18682 A1 | 5/1997 |
| WO | WO 2005/086405 A2 | 9/2005 |

OTHER PUBLICATIONS

ITU—Telecommunication Standardization Sector—Temporary Document SD-068—G.VDSL: In-Service Impulse Noise Logging for Troubleshooting Purposes and Alternative for INM—San Diego, USA, Jan. 2007.

* cited by examiner

*Primary Examiner* — Mark Rinehart
*Assistant Examiner* — Mohammad Anwar
(74) *Attorney, Agent, or Firm* — Harness, Dickey & Pierce, P.L.C.

(57) ABSTRACT

In a network for digital data packet transmission, quality records are stored in a memory. Each of the quality records is indicative for a reception quality being sensed of one or more received data packets. Thereupon, upon overflow of the memory, one or more of the quality records is discarded from the memory. For at least one of the quality records, discarding weights are generated as a function of at least one of the quality records and associated to the quality records. Hereby, upon such overflow, the discarding weights are taken into account in predefined rules and conditions according to which the discarding of the quality records is performed.

9 Claims, 1 Drawing Sheet

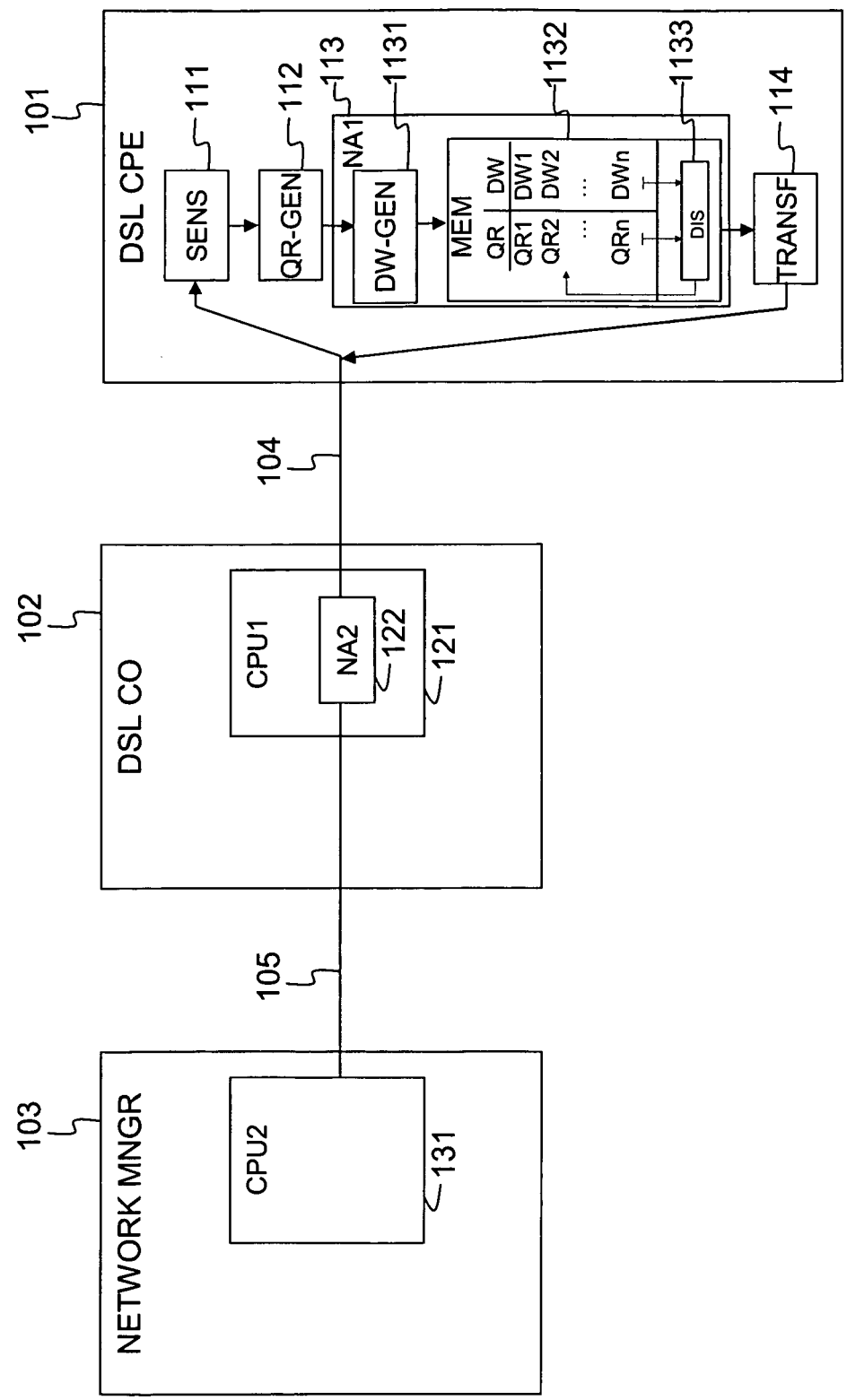

METHOD FOR MONITORING IMPULSE NOISE

The present invention generally relates to impulse noise managing in digital data communications i.e. the detection and characterization of impulse noise in received data packets.

Impulse noise is noise that is induced through electromagnetic coupling in a communication line by external noise sources and that is relatively short in duration. Switching a light switch on/off for instance may generate a transient effect on the supply voltage and current, resulting in noise impulses on the telephone line that may convey digital data, e.g. packed in Discrete Multi Tone (DMT) symbols when the telephone line is deployed as a DSL loop. Depending on the amplitude and duration of the impulse, the impulse noise will result in quality degradation and/or errors in the received data packets. It is noticed that within the context of the current patent application, data packets must be interpreted broadly to cover any fixed length or variable length group of data bytes or bits that is transferred as a single entity. In other words, it covers data frames, data cells, data words, data symbols, data segments, etc. An example of a data packet is for instance a DMT symbol sent over an ADSL (Asymmetric Digital Subscriber Line) or VDSL (Very High Speed Digital Subscriber Line) loop.

Single High Impulse Noise Environment is shortly called SHINE.

In the case of dimmers, fluorescent lights, Christmas rope lights, switched mode power supply units (PSUs) of TVs or PCs, video recorders, electronic transformers, security lights, etc. in the vicinity of a digital communication line, the noise impulses impairing digital data transfer over that communication line may have a repetitive character. Such repetitive noise impulses are still short in duration and therefore called repetitive electrical impulse noise (REIN). Typically, the time in between two successive noise impulses may be as small as 10 milliseconds (ms) in Europe or 8.3 ms in USA because the noise impulses are usually the result of on/off transitions at a rate based on the frequency of the electrical power, which is 50 Hertz (Hz) in Europe and 60 Hz in USA. In the example of a light dimmer for instance, the intensity of the light is controlled through electrical circuitry that switches the light on and off. The ratio between the on- and off-time determines the light intensity. Each on/off transition causes a noise impulse on neighbouring communication lines. The trigger for the on/off switching of the light is derived from the frequency of the electrical power grid, hence resulting in noise impulses as frequent as every 10 ms (in Europe) or 8.3 ms (in USA).

A known method to monitor impulse noise is described in the Standard Contribution SD-068.doc that was uploaded Jan. 11, 2007 at 00:35:49 Geneva time. This contribution with the title "G.VDSL: In-Service Impulse Noise Logging for Troubleshooting Purposes and Alternative for INM" describes a method for in-service Impulse Noise Logging for troubleshooting purposes and was loaded on the url:
http://ties.itu.ch/u/tsg15/sg15/xchange/wp1/g4/Meetings/2007-01-SanDiego/SD-068.doc.

This contribution contains a method for in-service Impulse Noise Logging for troubleshooting purposes. It proposes an on-line method for detailed characterization of impulse noises, without service interruption nor issues to collect the information from the digital Subscriber Line customer Premises Equipment (DSL CPE). It describes that the only way to avoid loosing information about the noise, is to actually record it. Since storing all this data in the receiver of the DSL CPE may not be very convenient, it is transferred to somewhere else where it can be recorded or interpreted.

The contribution further proposes to use an Impulse Noise sensor which indicates whether a data symbol is severely degraded or not and to send this data stream autonomously over a management channel i.e. the Digital Subscriber Line Embedded Operations Channel (EOC). The message could contain the timestamp, and a series of bits modeling the complete impulse noise event. So, in this way a method is described that decides whether Discrete Multitone Symbols DMT or Data are degraded whereby a bitstream is generated that is indicative for a reception quality being sensed of one or more received data packets.

It has to be further explained that this bit stream can be sent over the management channel i.e. the Digital Subscriber Line Embedded Operations Channel (EOC) according to an autonomous way i.e. by the DSL CPE or upon request from a corresponding network node with a central processing unit.

In order to work efficiently the amount of data to be transferred should be reduced, and a simple data reduction is introduced. Although this requires data processing by the receiver of the DSL CPE, at the same time, it has the additional benefit of reducing the amount of storage needed at the receiver of the DSL CPE. Such data reduction method could generate "quality records" i.e. bitstrings or groups of symbol quality bits. A trivial implementation could be that the quality records, are stored in a first-in-first-out memory FIFO. Especially in the event of transferring quality records upon request it is advised to monitor whether the FIFO overflows between a previous request and a current request to transmit bitstrings. Hereby, newest records are recorded and old records are discarded.

Such a quality record can be a fixed number of Symbol Quality bits, a timestamp with a fixed number of Symbol Quality bits, a timestamp with a count of consecutive degraded bits and/or a count of consecutive not degraded symbol bits, a combination of timestamps, number of counts, counts and bits.

Known methods are working with an indicator at the FIFO to indicate that there was an overflow in the FIFO between a previous transfer an a new transfer and to indicate that FIFO has (partly) new items since a last Symbol Quality request for transfer. Indeed when the read-out rate of a FIFO is not high enough, which is very likely, the oldest records are deleted in order to fill the FIFO again with recent records.

In the event that the impulse noise is only Repetitive Electrical Impulse Noise REIN, the Symbol Quality records will have a repetitive character. With the deletion of the oldest records in the FIFO, the information in these records is lost. However, since the records have a repetitive character, the lost information is irrelevant.

However, in the event that e.g. Repetitive Electrical Impulse Noise REIN and Single High Impulse Noise SHINE are both present on the line the Symbol Quality records don't have a repetitive character since SHINE is a non-repetitive impulse noise and is occurring relatively seldom. In the event of a buffer overflow, with the deletion of the oldest records in the FIFO, the information in these records is lost, whereby it could happen that the SHINE information is lost. This is a relevant loss of information whereby it might become impossible to characterize the impulse noise and to identify the noise source.

It is an object of the present invention to provide a method for monitoring impulse noise in a network for digital data packet transmission, which overcomes the above-mentioned drawback of the prior art method. More particularly, is it an objective to disclose a method for impulse noise monitoring that preserves the information available for impulse noise characterisation and impulse noise source identification.

According to the invention, the above defined objective is realized and the shortcomings of the know prior art solutions are overcome by the method for monitoring impulse noise in a network for digital data packet transmission defined by claim 1, comprising the steps of:

storing quality records in a memory that are indicative for a reception quality being sensed of one or more received data packets; and discarding one or more of the quality records from the memory upon overflow of the memory; and generating for and associating to at least one of the quality records discarding weights as a function of at least one of the respective quality records; and upon the above-mentioned overflow, discarding one or more of the quality records according to predefined rules and conditions taking into account the predetermined discarding weights.

It has to be remarked that the quality record is a symbol quality record as described above i.e. a string of bits or a compressed version of such a bit string that still comprises similar information as in the original raw bit string. Furthermore it is to be noticed that not all quality records must have an identical length.

In this way, by interpreting and using the information in the respective quality records a weight can be determined that is indicative to the relevance of information comprised in the quality records. This will be further explained by means of an example. The quality record in a simple version may contain one bit per received data packet e.g. 1 bit per received DMT symbol in a DSL receiver, the bit e.g. being set to "0" in case the reception quality of the DMT symbol exceeds a certain threshold and e.g. being set to "1" in case the reception quality of the DMT symbol stays below that threshold, or vice versa.

A bunch of quality records containing e.g. all "0" except one bit could point to the presence of REIN. Such kind of records comprise less relevant information then e.g. a single quality record containing e.g. a few "0", followed by a number of "1" and again followed by a number of "0". Such single quality record could point to the presence of SHINE.

In this way, for the first described bunch of quality records an e.g. lower discarding weight will be generated as for the second described quality record. In the event that overflows of the memory occurs the predetermined associated discarding weights are taken into account according to predetermined rules and conditions whereby, according to this example, the quality record being associated to the lowest discarding weight will be selected for discarding. The quality record having a high discarding weight will not be selected for discarding whereby its relevant information is still preserved and most probably will be transferred to a network node with at a processing unit upon e.g. one of the following requests.

So, by discarding one or more of the quality records according to predefined rules and conditions and taking into account the associated discarding weights, not just the oldest quality records will be discarded. Indeed, the method takes into account the information contained in the quality records to determine discarding weights and to discard one or more of the subsequent quality records according to predefined rules and conditions that takes into account these predetermined associated discarding weights.

It has to be remarked that one quality weight does not need to be associated to only one quality record but can be associated to more then one (e.g. consecutive) quality record.

A further remark is that a quality weight can be determined, not only based upon the information in one quality record but might as well be determined based upon the information in more then one quality record e.g. based upon previous quality records or in function of following quality records.

Furthermore, it has to be explained that the wording overflow has to be interpreted in his broadest sense. This means that "overflow" can be reached in the event that the memory is completely full whereby first a discarding of quality records is needed before any new quality record might be stored again. However, "overflow" can as well be reached in the event that the number of stored quality records exceeds a predefined threshold of the memory. Hereby, occurring new quality records can still be stored before one or more of the quality records are discarded according to the present method.

In addition to the method for managing impulse noise defined by claim 1, the current invention relates to a corresponding network apparatus as defined by claim 7.

As indicated by claim 2 the quality records might comprise firstly a quality indicator being indicative for the mentioned reception quality being sensed of one or more received data packets and secondly a time indicator being indicative for a time-moment of generating said quality record. Hereby the function comprises arguments being at least one of the respective quality indicators called quality indicator arguments and at least one of the respective time-indicators.

It has to be remarked that since the time indicator is indicative for a time-moment of generating the quality record, and since the moment of generating the quality record is representative for the time moment of sensing the reception quality of one or more received data packets, the time indicator is in fact representative for the moment of monitoring a source of impulse noise.

Furthermore, a possible implementation is described in claim 3 whereby the function comprises a relative higher contribution of the quality indicators versus the time indicators. The function according to claim 3 will generate a discarding weight that takes the relevance of the available information in these quality indicators more into account than the time moment when the quality record is/was generated. This enables the method of keeping older relevant quality records instead of discarding older records.

A further implementation is described in claim 4. Herein it is mentioned that in the event of equal generated discarding weights, the predefined rules and conditions are including the rule that the newest quality records will be discarded. This implementation enables preservation of relevant information in older quality records. Indeed, such an implementation enables preservation of older quality records that are including relevant information such as e.g. described in the above example with SHINE and REIN.

Claim 5 describes a possible implementation for the quality indicators with quality sub-indicators whereby each quality sub-indicator is indicative for the reception quality in one or more of the received data packets and whereby the function comprises a counting of the sub-indicators that are having a value contained in a specified set of values. This set of values can be implemented by e.g. using a threshold, hereby the set of values corresponds to all the values below this threshold. With an implementation of the quality sub-indicator by e.g. a plurality of bits, amplitude information on the sensed quality or quality degradation enabling all kinds of statistical analyses in impulse noise can be provided.

Such a quality sub-indicator can also e.g. be implemented with one single bit per received data packet whereby one bit is indicative for the mentioned reception quality in such received data packet passing a certain threshold. This is described in claim 6. The function mentioned comprises hereby a number of times that such one bit per received data packet is equal to a predefined value i.e. a "1" or a "0". However, such an implementation with one single bit per data packet cannot provide amplitude information on the sensed quality.

As mentioned above the step of generating and associating for at least one of the subsequent quality records a discarding weight based upon information in the respective quality record is not limited to a one-to-one generation and association. Indeed, the method can as well be implemented with generating and associating not for only one quality record but for a predefined number of quality records only one discarding weight.

Further, the network apparatus of claim 7 for monitoring impulse noise can be integrated in a network terminal for digital data packet transmission that is enabled to sense impulse noise in received data packets. This is described in claim 8. This means that such a network terminal firstly performed a sensing of reception quality of received data packets and furthermore performed generating of the quality records indicative for the reception quality sensed. This implementation is an implementation according to downstream digital data packet transmission with quality sensing in the network terminal and providing of quality records towards the network node.

However, the network element for monitoring impulse noise in a network for digital data packet transmission of claim 7, can be as well be integrated in a network node for digital data packet transmission. This is described in claim 9. According to such an implementation the network node can receive the quality records that were generated by an associated network terminal (quality of downstream transmitted data packets) and these quality records are hereby stored in a network element similar to claim 7 before further transmission to e.g. a network manager for further processing. Hereby the memory of the network apparatus might as well reach an overflow status whereby an intelligent discarding decision needs to be taken as well. The same remark is valid for a further network manager, which might as well comprise the network apparatus according to the present invention. Furthermore, but still according to the implementation of claim 9, the network node can receive by itself data packets upon which it performs a quality sensing whereby it generates by itself quality records. This is impulse noise monitoring of upstream data packets.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

The above and other objects and features of the invention will become more apparent and the invention itself will be best understood by referring to the following description of an embodiment taken in conjunction with the accompanying drawings wherein FIG. 1 illustrates an embodiment of the method for impulse noise managing according to the present invention in a DSL network comprising a network terminal 101, a network node 102 and a network manager 103.

The working of the device according to the present invention in accordance with its telecommunication environment that is shown in FIG. 1 will be explained by means of a functional description of the different blocks shown therein. Based on this description, the practical implementation of the blocks will be obvious to a person skilled in the art and will therefor not be described in details. In addition, the principle working of the method to mange noise impulse will be described in further detail.

FIG. 1 shows a DSL CPE (Digital Subscriber Line Customer Premises Equipment) modem 101 connected to a DSL CO (Digital Subscriber Line Central Office) 102 through DSL line 104. The DSL CPE 101 can for instance be an ADSL modem or VDSL modem whereas DSL CO 102 can be a DSLAM (Digital Subscriber Line Access Multiplexer), a line termination board within a DSLAM, or an ASIC (Application Specific Integrated Circuit) integrating one or plurality of central office DSL modems. The DSL CPE 101 in addition to the traditional DSL CPE functionality contains a DMT symbol reception quality sensor, SENS or 111, a DMT symbol quality record generator, QR-GEN or 112, a Network Apparatus NA1 to manage impulse noise 113 and a DMT symbol quality record transfer unit, TRANSF or 114.

The DSL CO 102 in addition to the traditional DSL CO functionality contains a first central processing unit, CPU1 or 121, that also has a Network apparatus NA2 or 122.

FIG. 1 further shows a DSL network manager, NETWORK MNGR or 103, equipped with a second central processing unit, CPU2 or 131.

In the downstream direction, DMT symbols are sent from the DSL CO 102 to the DSL CPE 101 over the DSL line 104. Upon reception of these DMT symbols at the DSL CPE 101, the symbol reception quality sensor 111 senses degradation of the DMT symbol quality for each received DMT symbol, for instance through erasure detection, SNR (Signal to Noise Ratio) measurement or BER (Bit Error Rate) calculation. Based on the sensed DMT symbol quality, the symbol reception quality sensor 111 generates 1 bit per DMT symbol indicative for the degradation of the respective DMT symbol. Such bit will be called a Symbol Quality bit or SQ bit in the following paragraphs. The symbol reception quality sensor 111 thus generates a DEgraded SYmbol bit or DESY bit (e.g. a bit set 1) in case the sensed DMT symbol quality stays below a certain threshold and generates a NOn-DEgraded SYmbol bit or NODESY bit (e.g. a bit set 0) in case the reception quality of the corresponding DMT symbol exceeds that same threshold. These SQ bits can be generated for a currently existing service or for a future service. The so generated bitsin the case of ADSL represent a datastream of about 4 kbit/s, named the SQ stream. The quality record generator (QR-GEN) 112 groups these bits into bitstrings, which together with a time indicator constitute the quality records.

The Network Apparatus NA1 contains a Discarding Weight generator DW-GEN or 1131, a Memory MEM or 1132 and a Discarder DIS or 1133.

The Discarding Weight Generator DW-GEN generates and associates for e.g. Quality record QR2 of the quality records QR a discarding weight DW2 based upon information in the respective Quality record QR2 i.e. the discarding weight DW2 is generated in function of the quality record QR2. A data couple (Quality record; Discarding weight) such as e.g. (QR2; DW2) is provided by the Discarding Weight Generator DW-GEN to the Memory MEM for storage. As mentioned previously, it has to be remarked that the scope of the present invention is not limited to the generation of a discarding weight in function of only one quality record. Indeed, a discarding weight can as well be generated in function of previous quality records or subsequent quality records. Furthermore, it has to be clear that on e discarding weight can as well be determined for more then one quality record.

Thereupon, the quality record is sent upstream to the DSL CO 102 over the EOC (Embedded Operations Channel) management channel by the transfer unit 114. This can be done autonomously, or this can be done based on requests issued by the DSL CO 102, more particularly by the central processing unit 121 therein. In the latter case, the Memory 1132 in the DSL CPE is indeed unavoidable to store the Quality records until transfer thereof is requested by the central processing unit 121. The size of the memory 1132 may for instance be fixed to 32 times 4 bytes.

The Memory MEM 1132 is monitored for overflows between a previous request and a current request. As soon as the size of Memory MEM is insufficient to store the new quality records, i.e. bit strings that have been generated after a previous request, one ore more of the stored quality records are to be discarded. The one or more quality records that are to be discarded, are determined according to predefined rules and conditions that take into account the predetermined associated Discarding Weights.

It has to be remarked that although FIG. 1 shows a storing of the discarding weights in an identical memory MEM as wherein the quality records are stored, the invention is not limited to this kind of implementation. Indeed, a second memory can be introduced as well in the Network Apparatus NA1 to store the generated discarding weights.

Furthermore, it has to be explained that the generation of discarding weights being associated to one or more quality records is not necessarily limited to a one-time generation. Indeed, additional functional blocks might be foreseen to re-calculate previous generated discarding weights. This can be performed e.g. in the event when a quality indicator of a quality record contains extremely relevant reception quality, a second function might be applied that comprises e.g. a higher weight for the contribution of the time indicator in the formulae whereby e.g. the quality record will be preserved for a longer time.

After transferring of the quality records to the first central processing unit CPU1, the received Quality records may be stored in a second Network Apparatus NA2 or 122. Indeed, since the quality records may be processed or compacted by CPU1 and may be further forwarded over channel 105 to the second central processing unit 131 in a network manager or network analyzer 103 that manages the entire DSLAM base of one or more DSL operators, or a part of the DSLAM base of a DSL operator, and since, here also, the transfer of the Quality records can be done autonomously (push model) or on explicit request of CPU2 (pull model), a second memory (not shown), being similar to the Memory of the Network apparatus NA1, may be supplemented with read, write, discard, and overflow management functions to adequately cope with the pace at which the Quality records are requested by CPU2. Hereby again, it makes sense to include indeed a second Network Apparatus NA2 similar to the first Network apparatus NA1 to enable an intelligent discarding of the quality records upon overflow of the memory.

A first remark is that DMT symbols or Discrete Multi Tone symbols referred to above, comprise according to the international DSL standards, data symbols and SYNC symbols. It is noticed however that such strict interpretation does not apply to the current invention as the bit string generated according to the present invention clearly may be based on DMT symbols or on data symbols only or on SYNC symbols only. Indeed, the bit string may even be calculated on alternate type of data packets, cells, words, symbols, etc.

Further, it will be apparent to persons skilled in the art of telecom equipment that the functional blocks drawn in FIG. 1 and explained above can be implemented in software, hardware or a combination of software and hardware.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. A method for monitoring impulse noise in a network for digital data packet transmission, said method comprising the steps of:
    storing quality records in a memory of a network element, each of said quality records including a quality indicator and a time indicator, the quality indicator being indicative for a reception quality being sensed of one or more received data packets; and
    discarding, in the network element, one or more of said quality records from said memory upon overflow of said memory,
    generating, in the network element, discarding weights as a function of said quality records;
    associating, in the network element, said discarding weights to said quality records; and
    upon said overflow, determining said one or more of said quality records according to predefined rules and conditions taking into account said discarding weights.

2. The method for monitoring impulse noise according to claim 1, wherein said time indicator being indicative for a time-moment of generating said quality record, whereby the arguments of said function comprise at least one of said respective quality indicators called Quality Indicator Arguments and at least one of said respective time indicators.

3. The method for monitoring impulse noise according to claim 2, wherein said function includes a relative higher contribution of said quality indicators versus said time indicators.

4. The method for monitoring impulse noise according to claim 1, said method further comprises, in the event of equal generated discarding weights, discarding according to said predefined rules and conditions the newest quality records.

5. The method for monitoring impulse noise according to claim 2, wherein each one of said quality indicators contains quality sub-indicators, each quality sub-indicator being indicative for said reception quality in one or more of said received data packets, said function comprising a sub-function for said Quality Indicator Arguments, being the counting of said sub-indicators having a value contained in a specified set of values.

6. The method for monitoring impulse noise according to claim 1, wherein such a quality record contains a bit string that further contains one bit per received data packet, said one bit being indicative for said reception quality in said received data packet passing a certain threshold, and said function comprising a sub-function for said bit string, being the counting of said one bit per received data packet having a predefined value.

7. Network apparatus for monitoring impulse noise in a network for digital data packet transmission, said network apparatus comprising thereto:
    a memory for storing quality records, each of said quality records including a quality indicator and a time indicator, the quality indicator being indicative for a reception quality being sensed of one or more received data packets; and means for discarding one or more of said quality records from said memory upon overflow of said memory, means for generating discarding weights as a function of said respective quality records;

associating said discarding weights to said respective quality records; and upon said overflow, determining by said means for discarding, one or more of said quality records according to predefined rules and conditions taking into account said discarding weights.

8. The network apparatus for monitoring impulse noise in a network for digital data packet transmission of claim 7, wherein said network apparatus being included in a network terminal for digital data packet transmission being able to sense impulse noise in received data packets.

9. The network apparatus for monitoring impulse noise in a network for digital data packet transmission of claim 7, wherein said network apparatus being included in a network node for digital data packet transmission.

* * * * *